United States Patent
Bugajski et al.

(10) Patent No.: US 9,479,807 B1
(45) Date of Patent: Oct. 25, 2016

(54) GATEWAY-BASED VIDEO CLIENT-PROXY SUB-SYSTEM FOR MANAGED DELIVERY OF A/V CONTENT USING FRAGMENTED METHOD IN A STATEFUL SYSTEM

(71) Applicants: Mark Bugajski, Suwanee, GA (US); Marcin Morgos, Warsaw (PL); Wade Ernest Carter, Snellville, GA (US); Carol Ansley, Johns Creek, GA (US)

(72) Inventors: Mark Bugajski, Suwanee, GA (US); Marcin Morgos, Warsaw (PL); Wade Ernest Carter, Snellville, GA (US); Carol Ansley, Johns Creek, GA (US)

(73) Assignee: ARRIS Enterprises, Inc., Suwanee, GA (US)

(*) Notice: Subject to any disclaimer, the term of this patent is extended or adjusted under 35 U.S.C. 154(b) by 257 days.

(21) Appl. No.: 13/632,719

(22) Filed: Oct. 1, 2012

Related U.S. Application Data (60) Provisional application No. 61/540,784, filed on Sep. 29, 2011.

(51) Int. Cl.
*G06F 15/16* (2006.01)
*H04N 21/24* (2011.01)
*H04N 21/2365* (2011.01)
*H04N 21/61* (2011.01)
*H04L 29/06* (2006.01)

(52) U.S. Cl.
CPC ........... *H04N 21/2402* (2013.01); *H04L 65/80* (2013.01); *H04N 21/2365* (2013.01); *H04N 21/6125* (2013.01)

(58) Field of Classification Search
None
See application file for complete search history.

(56) References Cited

U.S. PATENT DOCUMENTS

| | | | |
|---|---|---|---|
| 8,429,268 B2 * | 4/2013 | Riley et al. | 709/224 |
| 2001/0003830 A1 * | 6/2001 | Nielsen | H04L 12/5695 709/226 |
| 2004/0186877 A1 * | 9/2004 | Wang et al. | 709/200 |
| 2009/0019178 A1 * | 1/2009 | Melnyk | H04L 47/10 709/233 |
| 2009/0028170 A1 * | 1/2009 | Jiang | H04L 12/2856 370/406 |
| 2010/0299552 A1 * | 11/2010 | Schlack | H04L 47/10 714/4.1 |
| 2011/0066673 A1 * | 3/2011 | Outlaw | 709/203 |
| 2011/0107379 A1 * | 5/2011 | Lajoie | H04L 65/1016 725/87 |
| 2012/0131165 A1 * | 5/2012 | Baniel et al. | 709/223 |
| 2012/0131211 A1 * | 5/2012 | Schemitsch | G06F 17/30861 709/228 |
| 2012/0191805 A1 * | 7/2012 | Fee et al. | 709/217 |
| 2012/0324122 A1 * | 12/2012 | Miles et al. | 709/231 |
| 2014/0229570 A1 * | 8/2014 | Westberg | H04L 65/605 709/217 |

FOREIGN PATENT DOCUMENTS

WO   WO 2011139305 A1 * 11/2011

* cited by examiner

*Primary Examiner* — Chris Parry
*Assistant Examiner* — Caroline Jahnige
(74) *Attorney, Agent, or Firm* — Bart A. Perkins (57) ABSTRACT

Systems and methods can provide a gateway-based video client proxy subsystem for managing delivery of segmented video in a stateful system. Such systems can operating to provide segmented video streams client devices via customer premise gateway devices. The system can receive state information from the customer premise gateway devices for use in managing network resources associated transmitting with the segmented video streams, and deriving allocations of bandwidth to flows associated with the client devices based upon the state information received from the customer premise gateway devices.

18 Claims, 4 Drawing Sheets

GATEWAY-BASED VIDEO CLIENT-PROXY SUB-SYSTEM FOR MANAGED DELIVERY OF A/V CONTENT USING FRAGMENTED METHOD IN A STATEFUL SYSTEM

RELATED APPLICATIONS

This application is a Non-Provisional of U.S. Provisional Patent Application No. 61/540,784, entitled "Gateway-Based Video Client-Proxy Sub-System for Managed Delivery of A/V Content Using Fragmented Method in a Stateful System," filed Sep. 29, 2011, which is hereby incorporated by reference in its entirety.

BACKGROUND

The use of IP (internet protocol) to transport digital video is rapidly moving away from a simple, one-way UDP protocol. The emerging delivery methods do not use proprietary transports developed by content coding vendors (e.g. Adobe RTMP, available from Adobe Systems, Inc. of San Jose, Calif.) or other inefficient schemas that are based on progressive download or constant streaming of very large content files. The new methods embrace open standards and rely on transporting a series of small files (that when combined comprise the entire content asset) over an HTTP transport, or segmented HTTP transport (SHT). The SHTs typically use a construct called a manifest file to inform the client how to request the proper segments in the appropriate order. The small files are requested by the client devices and are being downloaded to the client buffer where they are assembled into a continuous flow, sent to the decoder and subsequently to the display for uninterrupted viewing. The buffer smoothes the play-out of often different sized segments asynchronously delivered over an IP network. One or more segments need to be delivered to the buffer before starting play-out.

Another feature that has been layered on top of SHTs that aids robustness of schema is called adaptive streaming. Rather than encoding content using single quality/bit rate setting for streaming or download, a method of simultaneous transcoding the single source content into multiple bit rates can be invoked. This process can create multiple versions of the same video at different resolutions and play-out bit rates that are time-equal and can be dynamically delivered to the same play-out device depending on the quality of its connection to the network. In this instance, the manifest file construct is extended with information that allows the client to play back at any of the encoded qualities.

The client can use a variety of algorithms to determine which play-out quality to choose. If operating conditions such as network congestion cause the client not to be able to receive the content at a previously requested resolution (e.g., bit rate) or if the CPU loading is too heavy and causing video frames to be dropped, then it may choose a lower quality version for the next segment(s) in the sequence. Conversely, if the conditions improve (connection quality or CPU loading), the client may ask for a higher quality version of the next segment.

Another augmentation of the adaptive SHTs is a feature called live streaming where the broadcasted programming is changed into point-to-point delivery in an almost real-time fashion. From a logical standpoint, the live streaming is not different than an on demand SHT, however from a real world standpoint at least two differences can be identified: 1) because the piece of content is being encoded in real-time, new segments are being created, so the manifest file is constantly updated, and 2) because the content is being produced and consumed at more or less the same time the client repeatedly requests an updated version of the manifest file to get information on how to request the newly added segments of video.

The migration to the HTTP transport brings about a number of benefits over proprietary or a UDP-based transport. HTTP is a standard that is broadly supported by network equipment like routers and CPE. Problems related to NAT (network address translation) that can occur with UDP-based transport protocol are not an issue with HTTP, which is based upon TCP. While there are multiple proprietary implementations of SHTs, as long as the SHTs are well behaved, the content segments can be cached in a traditional edge cache. The use of a content delivery network (CDN), which has globally distributed edge caches, provides a generic way to provide cost effective scale for content delivery.

However, the SHT content delivery method can sometimes cause problems with consistency of viewer's experience and perceived degradation of video quality. The issues result from the desire to quickly (faster than the actual play-back rate) pre-load the client's playback buffer with one or more segments to allow a new session to start. Also, when the viewer requests to fast-forward or rewind the content, the buffer is quickly re-loaded. If a fast re-load does not take place the playback will not start or resume, or after some time the client might request a switch the lower bit rate (and video quality) for the subsequent play-out.

In a bandwidth-constrained environment, especially access networks that carry multiple SHT flows, the frequent re-filling of play-out buffers and the resultant temporary increase of bandwidth by some client devices may have negative effect on performance of other client devices by consuming the available resources and causing 'starvation' of their buffers. As a result, many viewers can experience unexpected and annoying changes of video quality. To avoid such a video quality-flapping scenario, the service provider may choose to over-provision the bandwidth for each subscriber and incur higher delivery costs. In extreme cases, even generous bandwidth over-provisioning may not address the issues caused by SHT flows to devices with very deep buffers that play-out high definition content.

Bandwidth over-provisioning is inefficient and can impact a network operator's bottom line.

The current architecture of SHT solutions places most of the intelligence and responsibility for quality of play-out sessions inside the logic of client devices. The client decides what content play-out resolution to choose from the choices listed in the manifest file and makes requests for delivery of content segments (including fast pre-loading of the play-out buffer) without any consideration for other client devices that use the same network. All SHT client devices are inherently unaware of the state and needs of other devices.

Adaptive streaming has been designed to deliver the highest quality video from the client's perspective without considering the impact it can have on the delivery network.

SHT client devices can provide a sizeable memory buffer to their SHT players to better 'ride' over short duration network congestions, temporary delays associated with switching of routing of content segments and out-of-sequence delivery of the packets. The underlying HTTP protocols support retransmission of the corrupted or lost packets using the buffer as an elastic storage facility. Some implementations of the SHT players call for such buffers to be more than one minute deep, which translates into tens of Megabytes. The player has been designed to quickly fill-in at the start of the play-out session and re-fill when is emptied during the play-out. The buffer can be emptied whenever the viewer rewinds, fast-forwards the content, skips a commercial or makes a 'jump' to a different part of the content. Filling and re-filling of the buffers can cause significant increase of the demand for bandwidth that can affect other client devices that share the constrained network.

BRIEF DESCRIPTION OF THE DRAWINGS

Like reference numbers and designations in the various drawings indicate like elements.

DETAILED DESCRIPTION

Gateway-based video client-proxy sub-systems can enable a state-based system (which can also be refered to as stateful system) to address problems resulting from the lack of visibility of centralized control systems into status of the video players in the home-based audio/visual (A/V) devices that use a fragmented method of content delivery but do not directly report their status to the network-based stateful controller. The stateful system performs monitoring of transactions between client devices at customer premises and network-based video servers. The monitored information is subsequently being reported to the centralized, network based stateful controller entity that has visibility to all client devices that share the delivery network. The stateful controller subsequently commands the access systems to statically and dynamically allocate the available bandwidth across devices that share the access network. As a result, the system improves the overall network transport efficiency and quality of experience by the consumers interacting with video client devices.

As described above, in non-state-based systems, the various client devices are unaware of the activities or needs of other clients and therefore merely attempt to retrieve video without consideration of network loading. To further aggravate the situation, neither the network responsible for delivery of the segments, nor the content delivery systems that store and transfer out the segments are aware of the status of the play-out client. The network attempts to deliver segments originated at the server to the best of its ability and the server attempts to deliver the requested segments over the network as fast as it can.

Such architecture can be identified as 'state-less' because no higher authority monitors behavior of client devices. The devices in this architecture are not aware of bandwidth needs of other devices that share their network with and in resource constrained networks, this can negatively impact the operation of the system.

Figure 1:
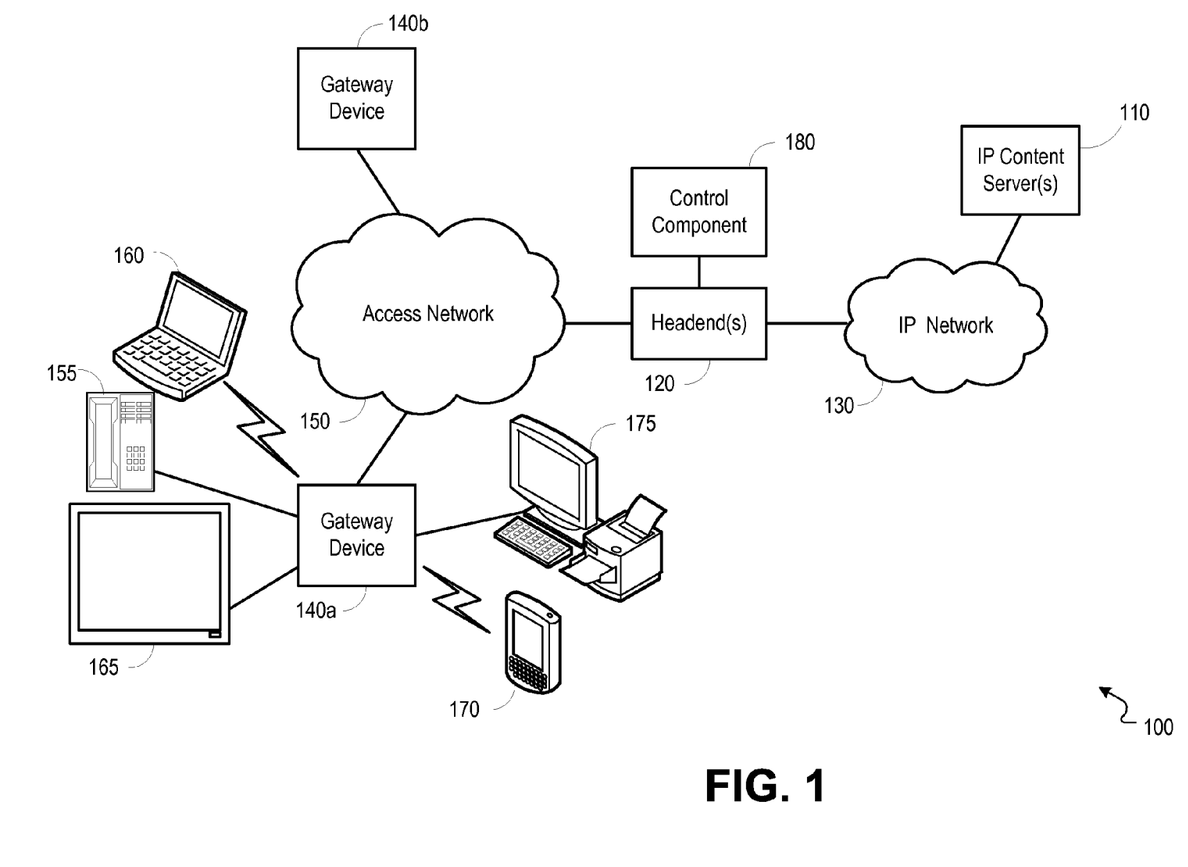
FIG. 1 is a block diagram illustrating an example network environment operable to deliver a segmented digital video stream.

FIG. 1 is a block diagram illustrating an example network environment operable to deliver a segmented digital video stream. In some implementations, one or more internet protocol (IP) content server(s) 110 can provide video over IP via a hypertext transfer protocol (HTTP) using segmented HTTP (SHT) to one or more headend(s) 120 through IP network 130. Additionally, the IP content server(s) 110 can include video coders operable to encode video at a plurality of resolutions or compression ratios. In other implementations, IP content server(s) 110 can deliver SHT video transport stream packets directly to headend 120.

The headend(s) 120 can aggregate one or more video streams for delivery to client device(s) through access network 150. The headend(s) 120 can be a DOCSIS cable modem termination system (CMTS), digital subscriber line access multiplexer (DSLAM), mobile cellular base station, wireless access point or optical line terminal (OLT). The access network 150 can be a DOCSIS based Hybrid-Fiber Coax network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network or other broadband access network.

In this example, the client device(s) are gateway devices 140a-b can be include DOCSIS cable modem (CM) and set top box functionality (e.g., including digital video recorder (DVR) functionality). The gateway devices 140a-b can be coupled to a home network (not shown) to facilitate distribution of the signal received via the access network 150 to various CPE devices 155-175. The CPE devices 155-175 can include a telephone 155, a laptop computer 160, a television 165, a mobile device 170, personal computer 175. The telephone 155 can be a plain old telephone service (POTS) device and can be connected to the gateway device via twisted pair connection to the gateway device 140a to provide telephony service to the user using POTS on the customer side and voice over internet protocol (VOIP) on the network side of the gateway device 140a. The laptop computer 160 can be operable to communicate wirelessly (e.g., via IEEE 802.11, Wi-Max or other standard) with the gateway device 140a. The television 165 can be operable to display video signals received from the gateway device 140a, for example, via a high-definition multimedia interface (HDMI) video, component video, composite video, or S-video interface, among others. In those implementations where the television 165 is "internet-ready" or "wi-fi enabled," the television 165 can be coupled to the gateway device 140a via the home network or wireless network. The mobile device 170 can be any of a wi-fi (or other wireless standard, such as, e.g., among others Wi-Max) enabled cellular phone, smartphone, tablet computer, personal digital assistant, etc. and can be coupled to the gateway device 140a via a wireless link. The personal computer 175 can be coupled to the gateway device 140a via the home network or a wireless link, if the computer 175 is wireless enabled.

In various implementations, any of the CPE devices 160-175 operable to display video can receive video content via the gateway device 140a, including broadcast video, multicast video (e.g., switched digital video (SDV), unicast video (e.g., video on demand), or over the top (OTT) video streams. In various examples, the gateway device(s) 140a-b can include a local interface that can forward IP video streams to one or more CPE devices. The local interface 190 can be based on the Multimedia over Coax Alliance (MoCA), 802.11, Ethernet, universal serial bus (USB), G.hn specifications, broadband over powerline (BPL), or other home networking specifications.

Playback devices 160-175 can request a video from a content server 110 by transmitting a request through the access network 150 to a headend 120. In some implementations, a headend can contain a cable modem termination system (CMTS). The CMTS can forward the request to a content server 110. The video stored on the content server 110 can be processed using either a MPEG-2 or a MPEG-4 codec to produce a segmented MPEG transport stream. The MPEG transport stream then is IP-encapsulated, and the IP-encapsulated MPEG video ("IP/MPEG video") is transported (for example, using progressive or continuous streaming) over the IP network 130 to a headend 120 and ultimately to the playback device 160-175.

In the headend 120, HTTP packets containing the IP/MPEG video can be received by a CMTS device and converted to a QAM signal representing the video ("QAM/IP/MPEG signal"), for example, for delivery over the access network 150. The QAM/IP/MPEG signal can then be combined with signals for other services (e.g., voice, non-video high-speed data) to produce a combined signal.

At the subscriber premise, a combined signal representing the combined signal can be received by a gateway (GW) device 140a-b and can be delivered (wirelessly and/or wired) to the playback device 160-175 to process and display the video. Other services (such as high speed data, for example) included in the combined signal can be delivered to other CPE devices (such as a personal computer 175, laptop 160, or mobile device 170, among others).

As another example, a video stored on an IP server (not shown) at the headend 120 can be delivered over the access network 150 to, for example, another subscriber premise where it is received by an IP television, for example, via a GW 140b. Similar to video stored on the content server 110, video can be processed using either a MPEG-2 or a MPEG-4 codec to produce an MPEG transport stream. The MPEG transport stream then is IP-encapsulated, and the IP-encapsulated MPEG video ("IP/MPEG video") can be processed for delivery over the access network 150 by the headend 120 to produce a QAM/IP/MPEG signal. The QAM/IP/MPEG signal can then be combined with signals from other services (e.g., QAM/IP/MPEG signal) to produce a combined signal. The combined signal, which includes the QAM/IP/MPEG signal, then can be transmitted over the access network 150 to a subscriber premise.

At the subscriber premise, such as the subscriber premises having the playback device 160-175, for example, the combined signal representing the video packets can be received by gateway device 140a-b. The IP/MPEG video packets representing the video program can separated from the combined signal and delivered to the respective playback device 160-175 that requested the video program. The playback device 160-175 can then process and display the video.

Instead of using a best effort delivery mechanism to deliver SHT video segments to the client, the systems described here can impose some controls that override the selfish behavior of the clients. A state-full (or stateful) system relies on a higher entity that collects information about status of players inside customer premises-based client devices 155-175, using a client-proxy inside the gateway device(s) 140a-b, that is aware of the available resources and manages the network elements in the bandwidth constrained network in a way that improves quality of experience of the viewer, while increasing the efficiency of the bandwidth usage In a stateful system, the gateway device 140a-b located between the access network 150 and the consumer's home network(s) monitors the status of transactions between the AV players 160-175 connected to the home network and the external content servers 110. The client-proxy component of the stateful system communicates to the control component 180 information about the client's 160-175 pertinent characteristics, past and current state and about its immediate needs. This information may include, but is not limited to, status of the play-out, approximation of buffer size, approximation of buffer fullness, segment delivery bit rates, and quality level of the viewed video. The network-based control component 180 aggregates this information for all of the GWs 140a-b and clients behind them.

Through various mechanisms from other network elements or applications, the control component 180 of the stateful system can be informed of which clients 160-175 share a common data delivery pathway. For example, in case of a CMTS/a DOCSIS cable modem/Gateway based transport, such a path is typically referred to as a downstream path. Through various mechanisms a control component 180 can also be informed about the bandwidth loading of the downstream path that is shared by multiple GWs 140a-b. After analyzing the state of the clients' 160-175 information from the client-proxy entities on a common downstream path, the control component 180 sends information to either the data transport system, or the server component or components that handle the requests for the segments about which requests or data streams should be given a higher priority to provide the overall best quality experience across the clients 160-175 on the downstream.

Based on the information received from the GW-based client-proxy entities, the stateful controller element 180 allocates resources to the client devices 160-175 behind the GWs 140a-b not only based on their instantaneous status but also using information about other client devices in order to avoid negatively impacting the performance of these other clients. For example, the stateful system can normalize buffer fill ratio across many client devices to provide them with a best-sized 'cushion' to ride over future temporary congestion. The stateful system can give a starting or trick-mode client device 160-175 a temporary, but not unlimited boost in available bandwidth to fill/refill its buffer while achieving the highest possible play-out resolution. The stateful system in instances of recovery from short duration black-outs or brown-outs can allocate amount of bandwidth to each client devices 160-175 to quickly re-fill their buffers to a point sufficient to start playing the content again.

In various implementations, a stateful SHT system can be more stable, predictable and manageable than a stateless system. In the stateful SHT system, the network resources can be allocated to client devices on dynamic-needs basis other than on best-effort or on an inefficient fixed allocation basis. The stateful SHT system can thereby operate to facilitate better coexistence of client devices 160-175.

Figure 2:
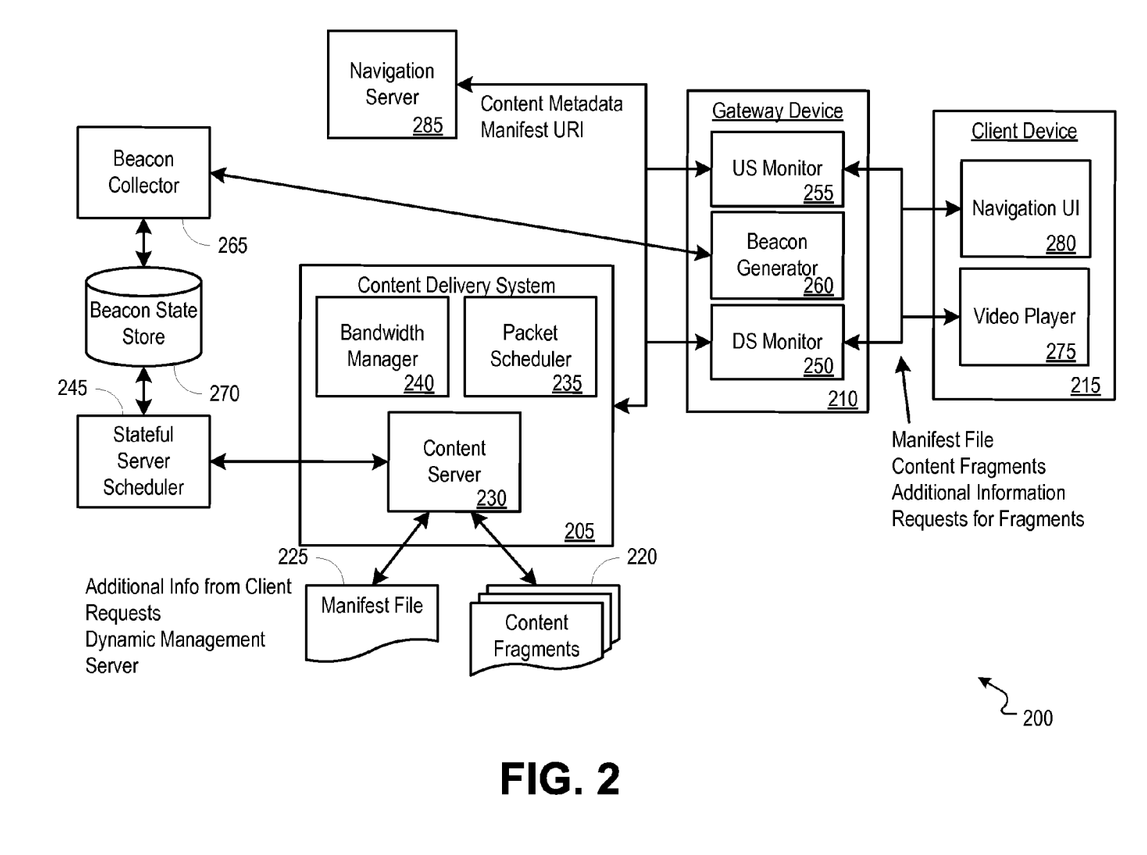
FIG. 2 is a block diagram illustrating an example managed video delivery system having a gateway based video client proxy sub-system.

FIG. 2 is a block diagram illustrating an example managed video delivery system 200 having a gateway based video client proxy sub-system. The managed video delivery system 200 can include a content delivery system 205, a gateway device 210, and a client device 215. The content delivery system 205 can be operable to provide SHT video (e.g., content fragments 220) to the client device 215 via the gateway device 210 (e.g., based on a manifest file 225). The content delivery system 205 can be an edge device operable to store content and manage delivery of segments to client devices 215 based on requests received from those client devices 215.

In some implementations, the content delivery system 205 can include a content server 230, an access scheduler (e.g., packet scheduler 235) and a bandwidth manager 240. In some implementations, the bandwidth management functionality can be performed by a digital subscriber line access multiplexer (DSLAM), fiber to the home (FTTH) optical line termination (OLT) or cable modem termination system (CMTS). The content server 230 can deliver content fragments 220 and manifest file 225 to the client device 215. The manifest file 225 can operate as an index to instruct the client device on assembly of the content fragments 220. The content delivery system 205 can receive commands from a stateful server scheduler 275 to manage static and dynamic resource allocations and flow priorities. The packet scheduler 235 and bandwidth manager 240 can cooperate with the stateful server scheduler 275 to ensure that resources are efficiently utilized. The content delivery system 205 can also operate to admit new client devices to the group and allocate bandwidth and flows to the new client devices, while also controlling allocation of downstream bandwidth to previously admitted individual or groups of client devices and/or flows. The content delivery system 205 can also receive additional information with requests from client devices and can forward the additional information to the stateful server scheduler 275 for consideration in the management of the system.

The gateway device 210 can include a gateway-based video client proxy. The gateway-based video client proxy can include a downstream monitor 250, an upstream monitor 255 and a beacon generator 260. The gateway-based video client proxy can use the downstream monitor 250 and upstream monitor 255 to monitor transactions between A/V clients on home network and wide area network-based content servers. The gateway-based video client proxy running on the gateway device 210 can also filter monitored information to retrieve relevant information about the various monitored clients to assist in managing the network usage in the stateful system. The gateway-based video client proxy can use the beacon generator 260 to communicate the relevant information to the stateful server scheduler 275 via a beacon collector 265.

In some implementations, the beacon collector 265 can receive information that is constantly, periodically or aperiodically transmitted by the gateway device 210 via the gateway-based video client proxy. The beacon collector can be a single machine or can be distributed collection of systems (e.g., behind a load balancer). The beacons can include state information about the various clients operating within the network and network location information about the client device(s). These beacons can be stored in a beacon state data store 270, such that multiple instances of the beacon collector 265 can access and store a beacon. In some implementations, the beacon collector 265 can be a part of the content delivery system.

In some implementations, the beacon state store 270 is operable to store beacons received from the client devices 210. The beacon data store 270 can be a central database, or can be a distributed database. The beacon state store 270 can store beacons receive from multiple of the client devices to provide insight into network loads. One or more stateful server schedulers 245 can access the beacon information aggregated in a beacon data store 270. The complete beacon(s) or key parameters extracted from them (for example number of occurrence in a specific time frame that a predetermined parameter exceeded a preset value) can be stored for some period of time. This period of time can be programmable (e.g., by a network administrator) and can depend on use cases associated with the information stored. In some implementations the beacon state store 270 can be a part of content delivery system 205.

The stateful server scheduler 245 can provide a centralized control point for the stateful managed video delivery system 200. In various implementations, the server scheduler 245 can collect information about client devices from the beacon state store 270, the content delivery system(s) 205, or combinations thereof. The server scheduler 245 can control one or more content delivery system 205 and includes information about network topology between the content delivery system 205 and respectively client devices 215, and can be aware of which clients 215 share bandwidth. Moreover, the server scheduler 245 can keep track of current resource allocations, spare bandwidth and pre-assigned priorities. The server scheduler 245 can thereby use predetermined and dynamic management rules to statically and/or dynamically instruct allocation of resources and priority assignments by the content delivery system(s) 205. In some implementations, the server scheduler 245 can be part of the content delivery system 205.

In some implementations, client devices 215 can include a video player 275 operable to play SHT A/V content. The client devices 215 can be connected to the content delivery system 205 via a modem or network converter (e.g., DSL modem, telephone modem, cable modem, FTTH ONU). The client device 215 can also include a navigation user interface 280 operable to facilitate selection of content, for example, via metadata provided by a navigation server 285. The video player 275 can request a particular piece of content from the content delivery system 205 by making a request for content to the content server 230 as identified by a URI provided by the navigation server 285. In response to the request, the video player 275 receives a description of the video file format and streaming options via a manifest document 225 associated with the requested content file. The video player 275 can initially request several fragments of the content file in order to fill out its play-out buffer, and can thereafter make periodic requests from the content server 230 for additional portions of the content (e.g., new content file fragments). In some implementations, when a user requests to change the play-out rate (e.g., fast forward, rewind, etc.), the video player can empty its buffer and request several new content file fragments 220.

In various implementations, the stateful server scheduler 245 can serve one content delivery system 205 or many content delivery systems. The stateful server scheduler 245 can use the information about usage of the content delivery systems to balance the delivery system loading. The bandwidth balancing can be a function of the stateful server scheduler or other, higher authority control network element.

Figure 3:
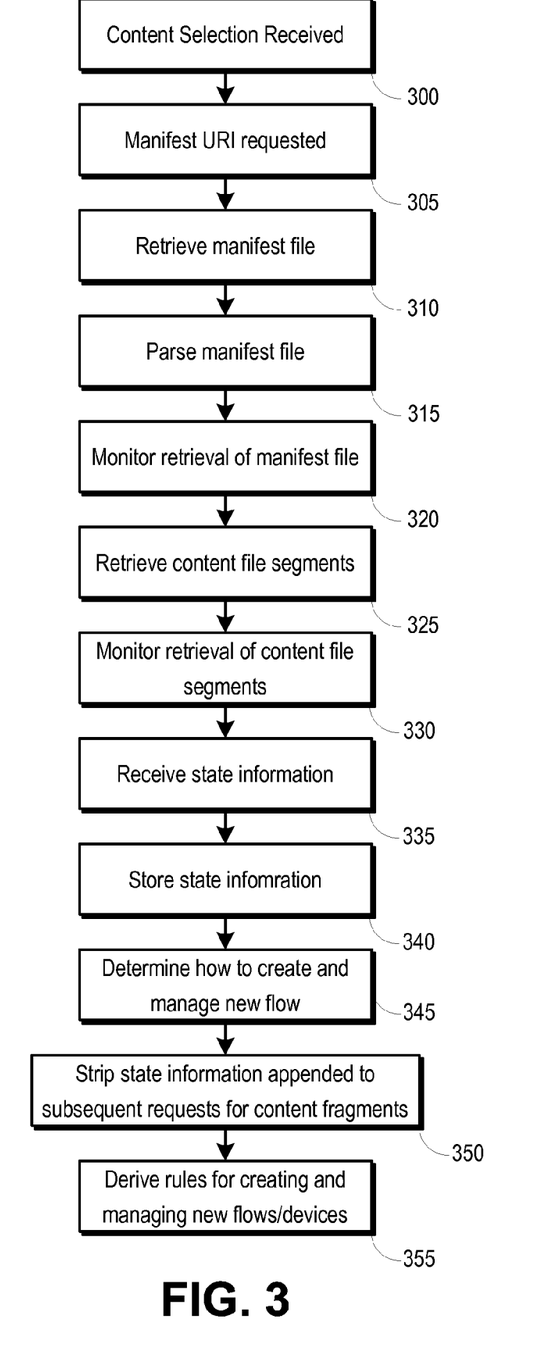
FIG. 3 is a flowchart illustrating an example operational scenario for a managed video delivery system using a gateway based video client proxy sub-system.

FIG. 3 is a flowchart illustrating an example operational scenario for a managed video delivery system using a gateway based video client proxy sub-system. At stage 300, the user selects content to be viewed. The user can select content to be viewed, for example, using a client device (e.g., client device 160-175 of FIG. 1, or 215 of FIG. 2). The content to be selected can be selected using any of a number of various currently available mechanisms. For example, a navigation server can provides content metadata, which is formatted by the navigation UI for presentation to the user. The content metadata can include information, graphics, and images describing the content. In some examples, this information can include movie poster images, actor and director information, as well as editorial content (e.g., reviews).

Once the selection has been made, the manifest URI for the content is requested at stage 305. The manifest URI can be requested, for example, by the client device (e.g., client device 215 using a video player 275 of FIG. 2). In some examples, the client device can fetch the manifest URI to locate the content server and the beacon collector URI to be used by the gateway device.

At stage 310, the manifest file referenced by the manifest URI is retrieved. The manifest file can be retrieved, for example, by the client device (e.g., client device 215 and video player 275 of FIG. 2).

At stage 315, manifest file is parsed. The manifest file can be parsed, for example, by a client device (e.g., client device 215 and video player 275 of FIG. 2). The manifest file can be parsed to choose the content for the desired bit rate and to identify and/or fetch a bit rate specific manifest file, if implicated.

At stage 320, the retrieval of the manifest file is identified and respective state information is stored. The retrieval of the manifest file can be identified, for example, by a gateway device (e.g., gateway device 210 and upstream monitor 255 of FIG. 2), and the state information can be stored, for example, by a beacon state store (e.g., via a beacon generator 260 and beacon collector 265 of FIG. 2).

At stage 325, content segments are retrieved. Content segments can be retrieved, for example, by a client device (e.g., client device 215 and video player 275 of FIG. 2). In some implementations, when the content is initially retrieved, several segments are retrieved consecutively, thereby facilitating an opportunity for the client device to fill its play-out buffers prior to playback.

At stage 330, the content retrieval transactions are monitored, and relevant information is used for network operations. The content retrieval can be monitored, for example, by a stateful server scheduler (e.g., stateful server scheduler 245 via beacon state store 270, beacon collector 265, beacon generator 260 and upstream and downstream monitors 250, 255 of FIG. 2).

At stage 335, status information associated with one or more client devices is provided. Status information associated with the one or more client devices can be provided, for example, by a gateway device based client proxy subsystem (e.g., gateway device 210 of FIG. 2). In some implementations, the particular status information provided can be based on pre-provisioned rules. The status information can be provided via an upstream beacon. The upstream beacon can be transmitted, for example, by a beacon generator on periodic or aperiodic intervals. In some implementations, the intervals can be pre-provisioned intervals (e.g., pre-provisioned periods, pre-provisioned triggers, etc.). In various examples, the state information can be transmitted as an HTTP cookie, or parameters added to the content URL. The state information can include, among others: a description of the client (e.g., player name, type, release version, etc.); default maximum depth of video play-out buffer; maximum depth/length of the play-out buffer; current depth/length of the play-out buffer; transfer rate of the previous (e.g., last) downloaded segment; length (e.g., in bytes) and duration (e.g., in milliseconds) of the most recently downloaded segment; all available quality levels (e.g., bit rates); quality level currently in use by the player (e.g., bits per second (bps)); bit rate switch flag (e.g., when the internal decision to switch bit rate is made by the player) with a time-stamp; trick-play flags indicating a request from the viewer (e.g., pause, fast-forward (various speeds), reverse (various speeds), slow motion (various speeds); video players estimation of available inbound bandwidth; percentage of past dropped frames; location of client device on the network (e.g., downstream connection being used by the client); round trip delay (e.g., interval between transmission of the last segment request and arrival of the response that contains 1st byte of the requested segment); maximum player screen resolution; content play-out time from beginning of session; segment sequence number of currently played segment; timestamp (e.g., time at which the state information was collected).

At stage 340, the state information is stored. The state information can be stored, for example, by a beacon collector (e.g., beacon collector 265 and beacon state store 270 of FIG. 2). A standard two-way IP communication protocol can be used to connect the beacon collector, beacon state store and stateful server scheduler elements.

At stage 345, in response to a first request for a content segment, a determination is made how to create and manage the flow for the request. The determination can be made, for example, by a content delivery system (e.g., content delivery system 205 of FIG. 2) in conjunction with a stateful server scheduler (e.g., stateful server scheduler 245 of FIG. 2). In some implementations, the determination can include the static and/or dynamic bandwidth to be assigned to the requested flow, the priority to assign to segment transfers, and/or how to handle exceptions or alarms. If historical information about the requesting client is not available, default values can be provided to the content delivery system and stateful server scheduler.

In response to request for subsequent segments, at stage 350 information appended to the request can be stripped and sent to a scheduler. The information can be stripped, for example, by a content delivery system (e.g., content delivery system 205 of FIG. 2).

At stage 355, information received about requested segments and/or other segments and/or client devices can be used to derive rules for creating and managing new downstream flows. The received information can be used, for example, by a stateful server scheduler (e.g., stateful server scheduler 245 of FIG. 2) to derive bandwidth/flow management rules.

Figure 4:
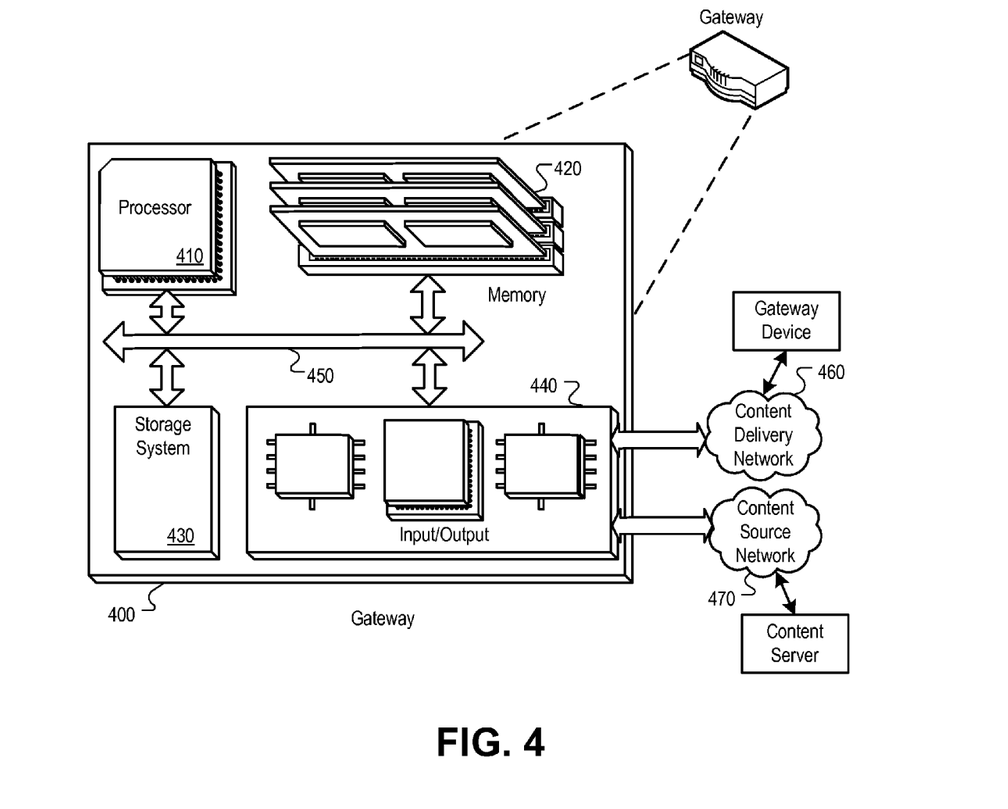
FIG. 4 is a block diagram of a content delivery system operable to replace ads in a manifest driven video transport.

FIG. 4 is a block diagram of an example content delivery system operable to manage delivery of segmented video streams. However, it should be understood that many different kinds of network devices (e.g., including network hubs, bridges, routers, edge termination devices, etc.) can implement a packet loss identification mechanism. The content delivery system 400 can include a processor 410, a memory 420, a storage device 430, and an input/output device 440. Each of the components 410, 420, 430, and 440 can, for example, be interconnected using a system bus 450. The processor 410 is capable of processing instructions for execution within the manifest server 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the server 400. In one implementation, the memory 420 is a computer-readable medium. In one implementation, the memory 420 is a volatile memory unit. In another implementation, the memory 420 is a non-volatile memory unit. The memory can include instances of various software modules operating on the content delivery system 400. In some implementations, the content delivery system 400 can include a content server, packet scheduler, bandwidth manager, stateful server scheduler, beacon collector and beacon data store. In other implementations, a subset of the components identified in the example of FIG. 4 as included within the content delivery system 400 can be provided on physically or logically separate hardware devices.

In some implementations, the storage device 430 is capable of providing mass storage for the content delivery system 400. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the server 400. In one implementation, the input/output device 440 can include a network interface device, e.g., an HFC network 460 interface or a packet network 470 interface.

The content delivery system 400 described by this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
    providing segmented video streams to a plurality of client devices via one or more customer premise gateway devices, the segmented video streams comprising multiple content file fragments and one or more manifest files respectively associated with the segmented video streams, wherein each respective one of the one or more customer premise gateway devices is located within a customer premise and is associated with one or more of the plurality of client devices;
    gathering, at each respective one customer premise gateway device of the one or more customer premise gateway devices, state information comprising buffer status information of audio/video players associated with the one or more client devices that are associated with the respective customer premise gateway device;
    outputting the state information from each respective one customer premise gateway device of the one or more customer premise gateway devices to a stateful server scheduler as one or more beacons;
    receiving, at the stateful server scheduler, the one or more beacons carrying state information from one or more of the customer premise gateway devices for use in managing network resources associated with transmitting the segmented video streams;
    storing the one or more beacons at the stateful server scheduler for use in deriving static and dynamic allocations of bandwidth to flows associated with the client devices; and
    deriving static and dynamic allocations of bandwidth to flows associated with each of the plurality of client devices, wherein the allocation of bandwidth to one or more flows associated with each respective one of the plurality of client devices is based upon the buffer status information of the audio/video player associated with the respective client device and the buffer status information of the audio/video player associated with at least one other client device of the plurality of client devices.

2. The computer-implemented method of claim 1, wherein state information comprises: a depth associated with a client play-out buffer; maximum depth associated with the client play-out buffer; transfer rate of a previous downloaded segment; available quality levels; quality level currently in use by the client; video players estimation of available inbound bandwidth; percentage of past dropped frames; location of client device on a home network; round trip delay; maximum client screen resolution; content play-out time from beginning of session; or segment sequence number of currently played segment.

3. The computer-implemented method of claim 1, further comprising:
    assigning priorities to the flows based upon the state information included in the collected beacons.

4. The computer-implemented method of claim 1, wherein providing segmented video streams to one or more client devices comprises:
    providing a manifest file associated with a requested stream, the manifest file referencing a plurality of content fragments associated with the requested stream; and
    repeatedly retrieving and forwarding a requested subset of content fragments associated with the requested stream and forwarding the requested subset of content fragments to the user upon receiving requests for the respective content fragments.

5. The computer-implemented method of claim 1, wherein the method is provided within one of a cable modem termination system, a digital subscriber line access multiplexer or a fiber to the home optical line termination.

6. The computer-implemented method of claim 1, wherein the method is provided within a switched digital video environment.

7. The computer-implemented method of claim 1, wherein the method is provided within an internet protocol television environment.

8. The computer-implemented method of claim 1, wherein state information comprises a depth associated with a client play-out buffer and a maximum depth associated with the client play-out buffer.

9. The computer-implemented method of claim 1, wherein state information comprises a transfer rate of a previously downloaded segment.

10. The computer-implemented method of claim 1, wherein state information comprises available quality levels and a quality level currently in use by the client device.

11. The computer-implemented method of claim 1, wherein state information comprises a video player estimation of available inbound bandwidth.

12. The computer-implemented method of claim 1, wherein state information comprises a percentage of previously transmitted frames associated with the client device that were dropped.

13. The computer-implemented method of claim 1, wherein state information comprises a location of the client device on a home network.

14. The computer-implemented method of claim 1, wherein state information comprises round trip delay associated with delivery of a segment.

15. The computer-implemented method of claim 1, wherein state information comprises a maximum resolution that the client device is configured to display.

16. The computer-implemented method of claim 1, wherein state information comprises content play-out time from beginning of a session.

17. The computer-implemented method of claim 1, wherein state information comprises a segment sequence number of a currently played segment.

18. A customer premise gateway device comprising:
one or more processors and memory, wherein, according to instructions of one or more non-transitory computer readable media, the one or more processors and memory control the following components of the customer premise gateway device:
an upstream monitor operable to filter and record upstream communications state information that is intercepted while being delivered from a plurality of client devices to a content delivery system;
a downstream monitor operable to filter and record downstream communications state information that is intercepted while being delivered from the content delivery system to the plurality of client devices;
one or more interfaces configured to be used to provide segmented video streams to the plurality of client devices, the segmented video streams comprising multiple content file fragments and one or more manifest files respectively associated with the segmented video streams;
wherein the upstream communications state information and the downstream communications state information comprises buffer status information of audio/video players associated with the plurality of client devices; and
a beacon generator operable to receive the recorded upstream and downstream communications and communicate the upstream and downstream communications state information to a stateful server scheduler that allocates bandwidth to flows associated with each of the one or more client devices, the upstream and downstream communications state information being used by the stateful server scheduler to manage network resources associated with transmitting the segmented video streams, wherein the allocation of bandwidth to one or more flows associated with each respective one of the plurality of client devices is based upon the upstream and downstream communications state information associated with the respective client device and the upstream and downstream communications state information associated with at least one other client device of the plurality of client devices.

\* \* \* \* \*